(12) United States Patent
Hwang

(10) Patent No.: US 9,753,539 B2
(45) Date of Patent: Sep. 5, 2017

(54) METHOD, DEVICE, SYSTEM AND NON-TRANSITORY COMPUTER-READABLE RECORDING MEDIUM FOR PROVIDING USER INTERFACE

(71) Applicant: FuturePlay Inc., Seoul (KR)

(72) Inventor: Sung Jae Hwang, Seoul (KR)

(73) Assignee: Futureplay Inc., Seoul (KR)

( * ) Notice: Subject to any disclaimer, the term of this patent is extended or adjusted under 35 U.S.C. 154(b) by 0 days.

(21) Appl. No.: 14/826,922

(22) Filed: Aug. 14, 2015

(65) Prior Publication Data
US 2016/0098084 A1 Apr. 7, 2016

(30) Foreign Application Priority Data

Oct. 2, 2014 (KR) .................. 10-2014-0132943
Jun. 3, 2015 (KR) .................. 10-2015-0078494
Jul. 24, 2015 (KR) .................. 10-2015-0105128

(51) Int. Cl.
*G06F 3/01* (2006.01)
*G06F 1/16* (2006.01)
*G06F 3/0488* (2013.01)
*G06F 3/0484* (2013.01)

(52) U.S. Cl.
CPC .............. *G06F 3/016* (2013.01); *G06F 1/163* (2013.01); *G06F 1/1626* (2013.01); *G06F 1/1698* (2013.01); *G06F 3/017* (2013.01); *G06F 3/04847* (2013.01); *G06F 3/04883* (2013.01)

(58) Field of Classification Search
CPC ......... G06F 3/016; G06F 3/017; G06F 3/0416
See application file for complete search history.

(56) References Cited

U.S. PATENT DOCUMENTS

| | | | |
|---|---|---|---|
| 8,378,795 B2 | 2/2013 | Steger et al. | |
| 2013/0198625 A1* | 8/2013 | Anderson | G06F 3/016 715/701 |
| 2014/0218184 A1 | 8/2014 | Grant et al. | |
| 2015/0145656 A1* | 5/2015 | Levesque | G06F 1/163 340/407.1 |
| 2015/0207914 A1 | 7/2015 | Hunt et al. | |
| 2015/0287293 A1* | 10/2015 | Grant | G08B 6/00 340/407.1 |

(Continued)

FOREIGN PATENT DOCUMENTS

| KR | 1020090034744 | 4/2009 |
|---|---|---|
| KR | 1020147024054 | 7/2010 |

(Continued)

*Primary Examiner* — Sahlu Okebato
(74) *Attorney, Agent, or Firm* — Dinsmore & Shohl LLP; Yongsok Choi

(57) ABSTRACT

According to one aspect of the present invention, there is provided a method for providing a user interface. The method comprises acquiring information on a position where at least one of a first device and a second device contacts a body of a user, and upon the occurrence of a triggering event that causes haptic feedback in at least one of the first device and the second device, controlling properties of haptic feedback provided in at least one of the first device and the second device, with reference to the acquired information on the body contact position, information on a display state associated with the triggering event, and information on contents or functions associated with the triggering event.

16 Claims, 18 Drawing Sheets

(56) References Cited

U.S. PATENT DOCUMENTS

| | | |
|---|---|---|
| 2015/0316985 A1 | 11/2015 | Levesque et al. |
| 2016/0036965 A1* | 2/2016 | Kim .................. H04M 1/72577 455/411 |
| 2016/0085303 A1 | 3/2016 | Israr et al. |
| 2016/0187976 A1 | 6/2016 | Levesque et al. |
| 2016/0259432 A1* | 9/2016 | Bau ....................... H04W 4/023 |

FOREIGN PATENT DOCUMENTS

| | | |
|---|---|---|
| KR | 1020140062841 | 5/2014 |
| WO | WO 2015/083183 A1 | 6/2015 |
| WO | WO 2015/127143 A1 | 8/2015 |

\* cited by examiner (a)

(b)

(c)

(a)          (b)          (c)

(a)

(b)

(c)

(d)

(a)

(b)

(c)

(d)

(a)

(b)

(c)

(d)

(e)

(f)

(g)

(h)

(i)

(a)

(b)

(a)

(b)

(a)

(b)

(a)

(b)

WATCH Intensity = 100 − brightness
PHONE Intensity = brightness (a)

Pixel brightness of Touch area
(brightness = 0 ~ 100)

(b)

(a)　(b)　(c)　(d)　(e)

(a)　　　　　　　　　　　(b)

(a)　　　　　　　　　　　(b)

(a)

(b)

(a)

(b)

(a)  (b)  (c)  (d)

(a)

(b)

(a)

(b)

METHOD, DEVICE, SYSTEM AND NON-TRANSITORY COMPUTER-READABLE RECORDING MEDIUM FOR PROVIDING USER INTERFACE

PRIORITY CLAIM

This application claims the benefit of Korean Patent Application No. 10-2014-0132943, filed on Oct. 2, 2014, Korean Patent Application No. 10-2015-0078494, filed on Jun. 3, 2015, and Korean Patent Application No. 10-2015-0105128, filed on Jul. 24, 2015, the entire contents all of which are incorporated herein by reference for all purposes as if fully set forth herein.

FIELD OF THE INVENTION

The present invention relates to a method, device, system and non-transitory computer-readable recording medium for providing a user interface.

BACKGROUND

The statements in this section merely provide background information related to the present disclosure and may not constitute prior art.

Recently, mobile smart devices having various communication and sensing capabilities and powerful computing capabilities, such as smart phones and smart pads, are being widely used. Among such mobile smart devices, there are relatively small-sized ones that may be worn and carried on a body of a user (e.g., a smart glass, a smart watch, a smart band, a smart device in the form of a ring or a brooch, a smart device directly worn on or embedded in a body or a garment, etc.)

In this situation, a user may desire to perform a task using two or more (different kinds of) smart devices of the user, or may desire a task to be performed in which smart devices of the user and another user are required to be involved together. Further, the user may desire to intuitively receive information on the performance state of the task. However, this (latent) intention and needs of the user could not have been properly supported in prior art.

SUMMARY OF THE INVENTION

One object of the present invention is to fully solve the above problem.

Another object of the invention is to intuitively provide a user, via haptic sensation, with information on a task performed in a state in which two or more devices are associated, by acquiring information on a position where at least one of a first device and a second device contacts a body of the user, and upon the occurrence of a triggering event that causes haptic feedback in at least one of the first device and the second device, controlling properties of haptic feedback provided in at least one of the first device and the second device, with reference to the acquired information on the body contact position, information on a display state associated with the triggering event, and information on contents or functions associated with the triggering event.

According to one aspect of the invention to achieve the objects as described above, there is provided a method for providing a user interface, comprising the steps of: acquiring information on a position where at least one of a first device and a second device contacts a body of a user; and upon the occurrence of a triggering event that causes haptic feedback in at least one of the first device and the second device, controlling properties of haptic feedback provided in at least one of the first device and the second device, with reference to the acquired information on the body contact position, information on a display state associated with the triggering event, and information on contents or functions associated with the triggering event.

According to another aspect of the invention, there is provided a device for providing a user interface, comprising: a sensing module for acquiring information on a position where the device contacts a body of a user, and sensing the occurrence of a triggering event that causes haptic feedback in at least one of the device and another device associated with the device; and a program module for, upon the occurrence of the triggering event, controlling properties of haptic feedback provided in at least one of the device and the another device, with reference to the acquired information on the body contact position, information on a display state associated with the triggering event, and information on contents or functions associated with the triggering event.

According to yet another aspect of the invention, there is provided a system for providing a user interface, comprising: a control unit for acquiring information on a position where at least one of a first device and a second device contacts a body of a user, and upon the occurrence of a triggering event that causes haptic feedback in at least one of the first device and the second device, controlling properties of haptic feedback provided in at least one of the first device and the second device, with reference to the acquired information on the body contact position, information on a display state associated with the triggering event, and information on contents or functions associated with the triggering event; and a storage for storing information provided from at least one of the first device and the second device.

In addition, there are further provided other methods, devices and systems to implement the invention, as well as non-transitory computer-readable recording media having stored thereon computer programs for executing the methods.

According to the invention, information on a task performed in a state in which two or more devices are associated may be intuitively provided to a user via haptic sensation.

According to the invention, various patterns of haptic feedback may be provided to enable direct sensing of information on a task performed between a device worn on a body of a user and a device not worn thereon, or a task performed between two or more devices worn on the body of the user.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF THE PREFERRED EMBODIMENTS

Figure 1:
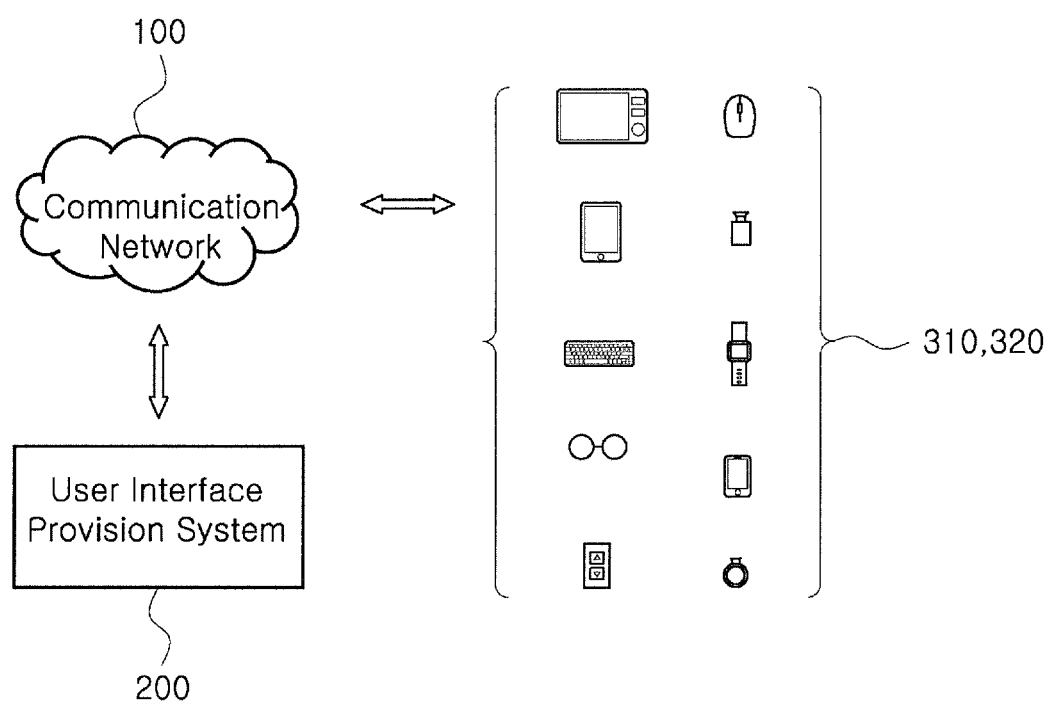
FIG. 1 schematically shows the configuration of an entire system for providing a user interface according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of an Entire System

FIG. 1 schematically shows the configuration of an entire system for providing a user interface according to one embodiment of the invention.

As shown in FIG. 1, the entire system according to one embodiment of the invention may comprise a communication network 100, a user interface provision system 200, and multiple devices 310, 320.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

Next, the user interface provision system 200 according to one embodiment of the invention may be digital equipment having a memory means and a microprocessor for computing capabilities. The user interface provision system 200 may be a server system. The user interface provision system 200 may function to mediate so that via the communication network 100, one of the devices 310, 320 may transmit information or a control command to the other, or the one may receive information or a control command from the other.

To this end, as will be described in detail below, the user interface provision system 200 may function to intuitively provide a user, via haptic sensation, with information on a task performed in a state in which two or more devices are associated, by acquiring information on a position where at least one of a first device and a second device contacts a body of the user, and upon the occurrence of a triggering event that causes haptic feedback in at least one of the first device and the second device, controlling properties of haptic feedback provided in at least one of the first device and the second device, with reference to the acquired information on the body contact position, information on a display state associated with the triggering event, and information on contents or functions associated with the triggering event.

The provision of the user interface may be performed by a control unit (not shown) included in the user interface provision system 200. The control unit may reside in the user interface provision system 200 in the form of a program module. The program module may be in the form of an operating system, an application program module, or other program modules. Further, the program module may also be stored in a remote storage device that may communicate with the user interface provision system 200. Meanwhile, such a program module may include, but not limited to, a routine, a subroutine, a program, an object, a component, a data structure and the like for performing a specific task or executing a specific abstract data type as will be described below in accordance with the invention.

Further, the user interface provision system 200 may further function to store information on the occurrence or position of body contact provided from at least one of the multiple devices 310, 320 and allow the information to be used by at least one of the multiple devices 310, 320. Furthermore, the user interface provision system 200 may further function to store information constituting contents or functions provided in at least one of the multiple devices 310, 320 and allow the information to be used by at least one of the multiple devices 310, 320. The storing may be performed by a storage (not shown) included in the user interface provision system 200. The storage encompasses a computer-readable recording medium, and may refer not only to a database in a narrow sense but also to a database in a broad sense including file-system based data records and the like.

The function of the user interface provision system 200 will be discussed in more detail below. Meanwhile, although the user interface provision system 200 has been described as above, the above description is illustrative and it is apparent to those skilled in the art that at least some of the functions or components required for the user interface provision system 200 may be implemented or included in at least one of the multiple devices 310, 320 to be operated, as necessary.

Lastly, the multiple devices 310, 320 according to one embodiment of the invention are digital equipment that may function to connect to and then communicate with the user interface provision system 200 or a counterpart of the multiple devices 310, 320 (which may preferably be separated or externalized from each other), and any type of digital equipment having a memory means and a microprocessor for computing capabilities may be adopted as the devices 310, 320 according to the invention. The devices 310, 320 may be so-called smart devices such as a smart phone, a smart pad, a smart glass, a smart watch, a smart band, a smart ring, and a smart necklace, or may be somewhat traditional devices such as a desktop computer, a notebook computer, a workstation, a personal digital assistant (PDA), a web pad, a mobile phone, buttons, a mouse, a keyboard, and an electronic pen. Further, the devices 310, 320 may be Internet of Things (IoT) devices such as a remote control and a home appliance.

Particularly, according to one embodiment of the invention, the devices 310, 320 may include at least one technical means for generating haptic feedback (e.g., vibration, etc.) provided to a user. Examples of the technical means may include commonly known components such as an actuator and a vibration motor.

Further, according to one embodiment of the invention, the devices 310, 320 may include at least one technical means for receiving an operation from a user. Examples of the technical means may include sensing modules which are commonly known components such as a touch panel, a pointing tool (e.g., a mouse, a stylus, an electronic pen, etc.), a graphical object operable by the user, a keyboard, a toggle switch, a biometrics (like fingerprints) sensor, a distance sensor, and the like.

Furthermore, according to one embodiment of the invention, the devices 310, 320 may include at least one technical means for acquiring physical information on postures or motions of the devices 310, 320. Examples of the technical means may include sensing modules which are commonly known components such as a motion sensor, an acceleration sensor, a gyroscope, a magnetic sensor, a positioning module (a GPS module, a beacon-based positioning (position identification) module, etc.), a barometer, a distance sensor, a camera, and the like.

Moreover, according to one embodiment of the invention, the devices 310, 320 may include a technical means for acquiring physical information on postures or motions of the devices 310, 320 on the basis of biometrics acquired from a body of a user carrying the devices 310, 320. Examples of the technical means may include sensing modules such as an electromyogram (EMG) signal measurement apparatus and the like.

In addition, the devices 310, 320 may further include an application program for processing the above physical information to transmit information or a control command to another device (310, 320, or the like), to receive information or a control command from another device (310, 320, or the like), or to generate the information or control command. The application may reside in the corresponding devices 310, 320 in the form of a program module. The nature of the program module may be generally similar to that of the aforementioned control unit of the user interface provision system 200. Here, at least a part of the application may be replaced with a hardware or firmware device that may perform a substantially equal or equivalent function, as necessary.

Meanwhile, according to one embodiment of the invention, when it is recognized that the first device 310 and the second device 320 have an association (e.g., indicating that they belong to the same user, they function for the sake of the same user, they are located substantially close to each other, or one of them is competent to authenticate or permit the other), a connection may be formed between the first device 310 and the second 320. The recognition or connection may be performed by the user interface provision system 200 or by the first device 310 and the second device 320.

Embodiments

Hereinafter, specific examples will be discussed in detail wherein the user interface provision system 200 according to the invention provides a user interface in which the multiple devices 310, 320 are involved according to various embodiments of the invention.

According to one embodiment of the invention, the user interface provision system 200 may acquire information on a position where at least one of the first device and the second device contacts a body of a user, and upon the occurrence of a triggering event that causes haptic feedback in at least one of the first device 310 and the second device 320, control properties of haptic feedback provided in at least one of the first device 310 and the second device 320, with reference to the acquired information on the body contact position, information on a display state associated with the triggering event, and information on contents or functions associated with the triggering event. Here, only one of the first device 310 and the second device 320 may contact the body of the user, or both of the first device 310 and the second device 320 may contact the body of the user.

According to one embodiment of the invention, a triggering event may encompass all types of events that may be sensed by the first device 310, the second device 320, or the user interface provision system 200, in which the first device 310 and the second device 320 may be involved. For example, the triggering event may include an event in which a user makes a touch operation on the first device 310 or the second device 320. For another example, the triggering event may include an event in which a task such as data transmission, payment, and security authentication is performed between the first device 310 and the second device 320 as the first device 310 and the second device 320 interact with each other. For yet another example, the triggering event may include an event in which a relative relationship between postures or motions of the first device 310 and the second device 320 corresponds to a predetermined relationship (e.g., a relationship where a display screen of the first device 310 and that of the second device 320 face opposite directions.)

Specifically, in response to the occurrence of a triggering event, the user interface provision system 200 according to one embodiment of the invention may cause at least a part of haptic feedback provided in the first device 310 to be provided in the second device 320, or cause at least a part of haptic feedback provided in the second device 320 to be provided in the first device 310.

Further, according to one embodiment of the invention, in response to the occurrence of a triggering event, the user interface provision system 200 according to one embodiment of the invention may function to determine properties (i.e., patterns) of haptic feedback respectively provided in the first device 310 and the second device 320, with reference to a display state of a region associated with the triggering event. For example, it may be determined according to color or brightness of a graphical object displayed in a region being touched by a user, in which of the first device 310 and the second device 320 haptic feedback will be generated.

Furthermore, according to one embodiment of the invention, in response to the occurrence of a triggering event, the user interface provision system 200 according to one embodiment of the invention may function to determine patterns of haptic feedback respectively provided in the first device 310 and the second device 320, with reference to contents or functions associated with the triggering event. For example, when some data are transmitted from the first device 310 to the second device 320, the intensity of vibration provided in the first device 310 may be reduced while that of vibration provided in the second device 320 may be increased, so that a user may be provided with a user experience (UX) in which the user feels as if the vibration having been provided in the first device 310 has been brought to the second device 320.

Moreover, in response to the occurrence of a triggering event, the user interface provision system 200 according to one embodiment of the invention may function to determine patterns of haptic feedback respectively provided in the first device 310 and the second device 320, with reference to information on a position where the first device 310 or the second device 320 contacts a body of a user. For example, when the first device 310 and the second device 320 respectively contact a first point and a second point of the body of the user, patterns of haptic feedback respectively provided in the first device 310 and the second device 320 may be appropriately adjusted, so that the user may be provided with a user experience in which the user feels as if the haptic feedback is generated at a point located between the first and second points.

Here, the patterns of haptic feedback respectively provided in the first device 310 and the second device 320 may be specified by at least one of a time, order, interval, and intensity in which the haptic feedback is provided. According to one embodiment of the invention, the pattern of haptic feedback provided in the first device 310 may have a complementary relationship with that of haptic feedback provided in the second device 320.

Figure 2:
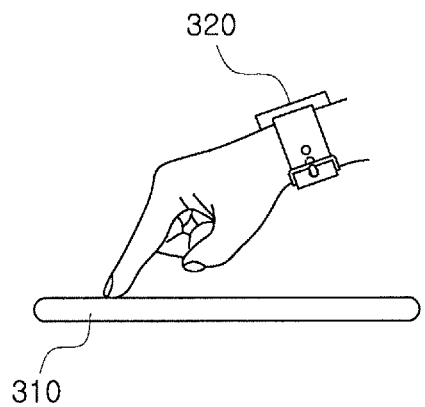
FIGS. 2 and 3 illustratively show how haptic feedback is provided in a first device not worn on a body of a user and a second device worn thereon according to one embodiment of the invention.
Figure 2:
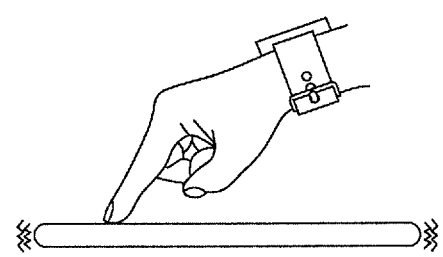
Figure 2:
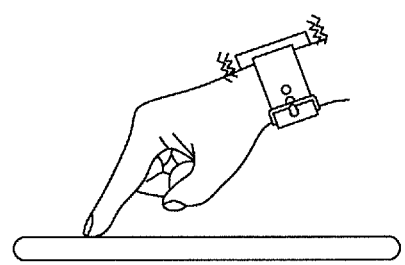
Figure 3:
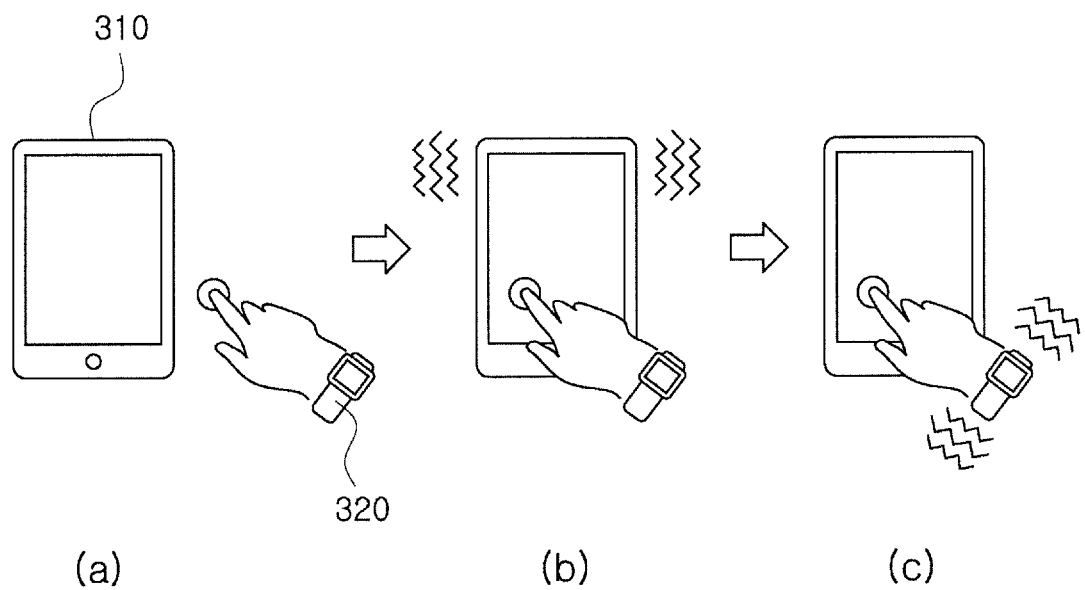

FIGS. 2 and 3 illustratively show how haptic feedback is provided in a first device not worn on a body of a user and a second device worn thereon according to one embodiment of the invention.

Referring to FIGS. 2 and 3, upon the occurrence of a triggering event in which a user wearing the second device 320 worn on a wrist touches a touch panel of the first device 310, the user interface provision system 200 according to one embodiment of the invention may cause vibration to be generated in the first device 310 and then in the second device 320, so that the user may be provided with a user experience in which the user feels as if the vibration having been provided in the first device 310 has been brought to the second device 320 worn on the user's wrist.

Figure 4:
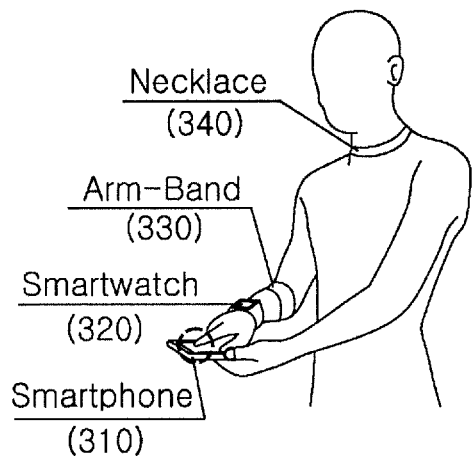
FIGS. 4 and 5 illustratively show how haptic feedback is provided in two or more devices worn on a body of a user according to one embodiment of the invention.
Figure 4:
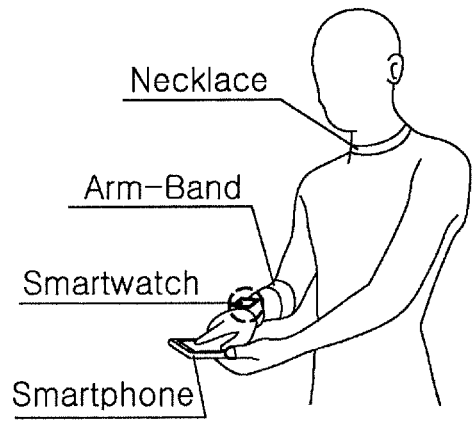
Figure 4:
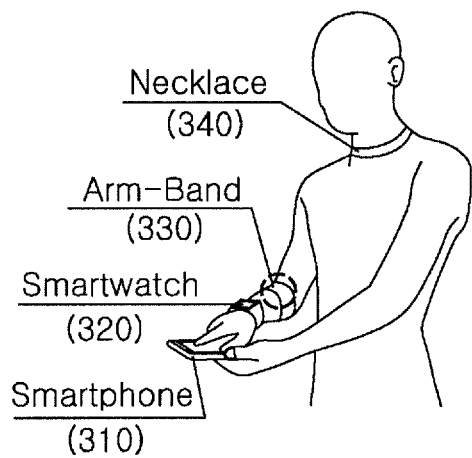
Figure 4:
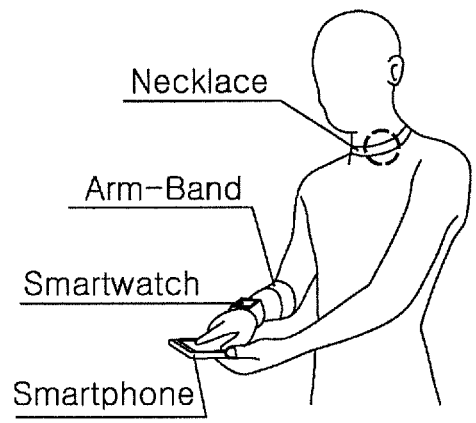
Figure 5:
Figure 5:
Figure 5:
Figure 5:
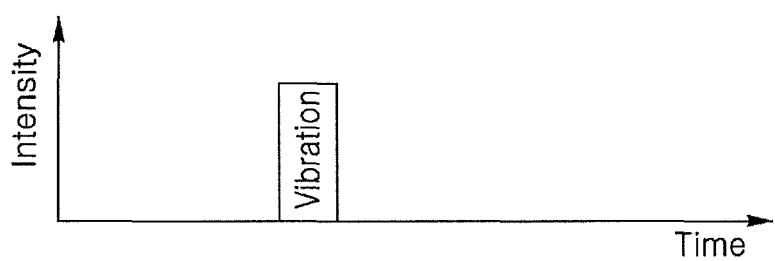
Figure 5:
Figure 5:
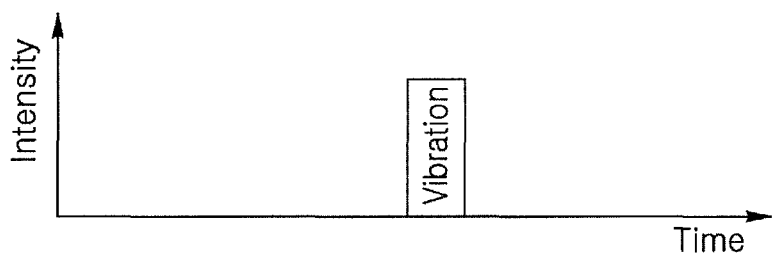
Figure 5:
Figure 5:
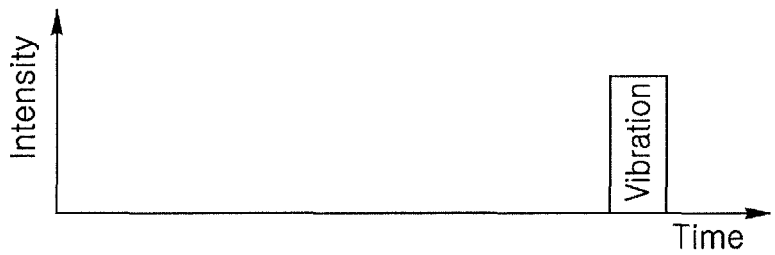

FIGS. 4 and 5 illustratively show how haptic feedback is provided in two or more devices worn on a body of a user according to one embodiment of the invention.

Referring to FIG. 4, it may be assumed that a user holds a smart phone 310 in a hand with a smart watch 320, a smart band 330, and a smart necklace 340 worn on a wrist, a forearm, and a neck, respectively. In this case, the user interface provision system 200 according to one embodiment of the invention may cause haptic feedback (i.e., vibration) to be generated in the smart phone 310, the smart watch 320, the smart band 330, and the smart necklace 340 in the above-listed order or in the reverse order, thereby providing the user with spatiotemporal haptic feedback.

Referring to FIG. 5, the user interface provision system 200 according to one embodiment of the invention may determine times at which haptic feedback is respectively generated in the smart phone 310, the smart watch 320, the smart band 330, and the smart necklace 340, with reference to positions where the smart phone 310, the smart watch 320, the smart band 330, and the smart necklace 340 are respectively worn on the body of the user. For example, as distances between the positions where the smart phone 310, the smart watch 320, the smart band 330, and the smart necklace 340 are respectively worn on the body are longer, intervals between the times at which haptic feedback is generated in the respective devices may be determined to be longer.

Figure 6:
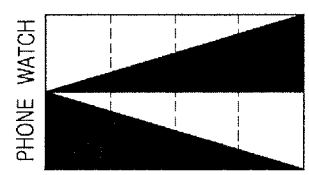
FIGS. 6 and 7 illustratively show patterns of haptic feedback provided in two or more devices according to one embodiment of the invention.
Figure 6:
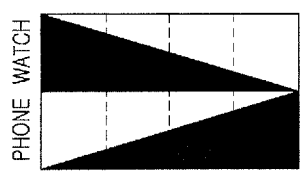
Figure 6:
Figure 6:
Figure 6:
Figure 6:
Figure 6:
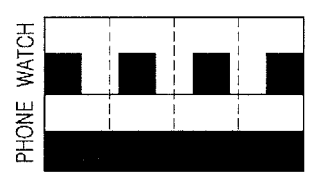
Figure 6:
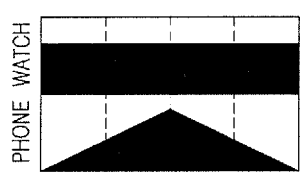
Figure 6:
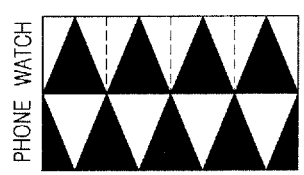
Figure 7:
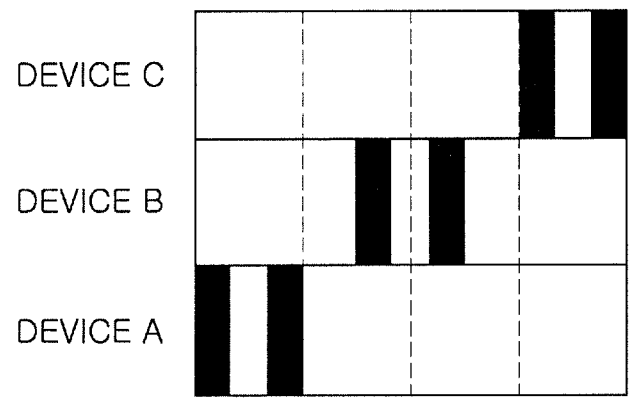
Figure 7:
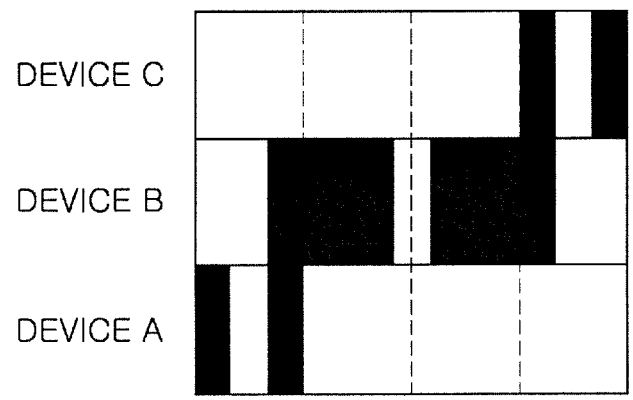

FIGS. 6 and 7 illustratively show patterns of haptic feedback provided in two or more devices according to one embodiment of the invention.

Referring to (a) to (i) of FIG. 6, the user interface provision system 200 according to one embodiment of the invention may cause a variety of haptic feedback to be provided in the first device 310 being a smart phone and the second device 320 being a smart watch, and specifically, a time, cycle, interval, intensity, and the like in which the haptic feedback is provided may be variously determined. Referring to (a) and (b) of FIG. 7, even when there are three or more devices that provide haptic feedback according to the invention, a time, cycle, interval, intensity, and the like in which the haptic feedback is provided in each of the three or more devices may be variously determined.

FIGS. 8 to 14 illustratively show how patterns of haptic feedback provided in two or more devices are determined on the basis of a display state of a region associated with a triggering event according to one embodiment of the invention.

Figure 8:
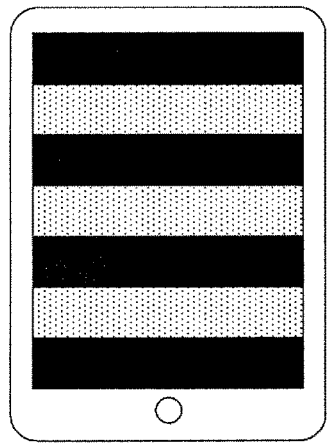
FIGS. 8 to 14 illustratively show how patterns of haptic feedback provided in two or more devices are determined on the basis of a display state of a region associated with a triggering event according to one embodiment of the invention.
Figure 8:
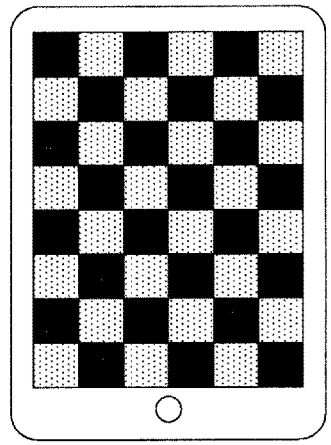
Figure 8:
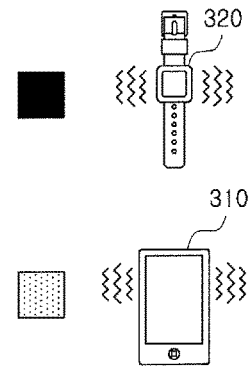
Figure 9:
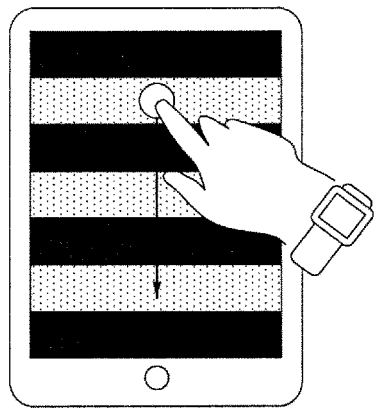
Figure 9:
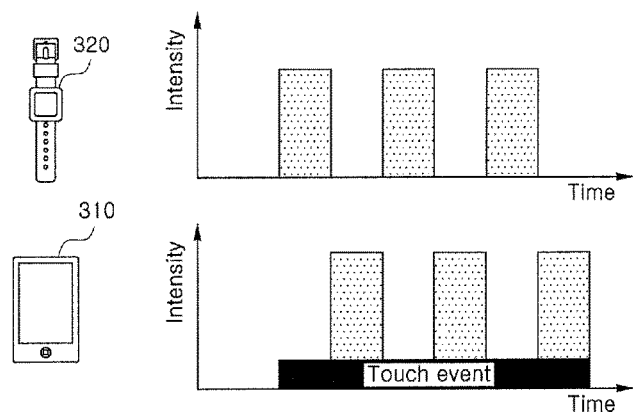
Figure 10:
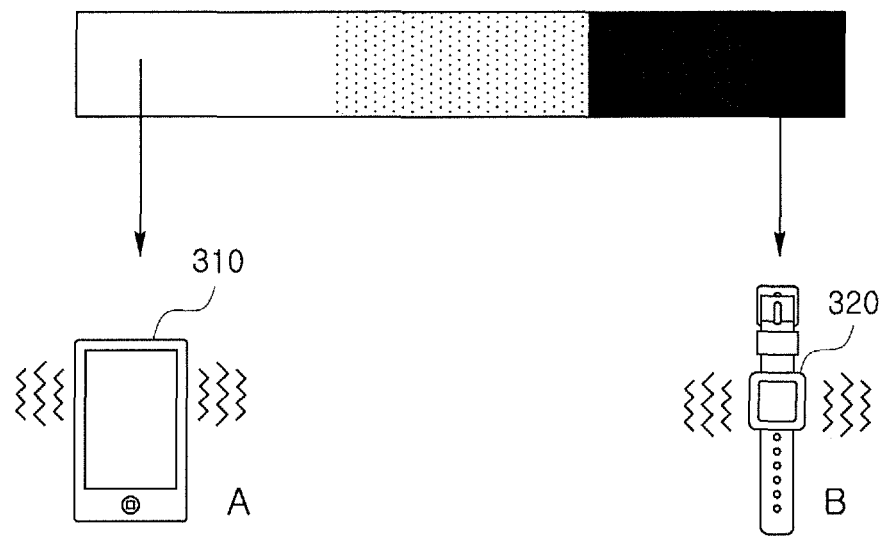
Figure 10:
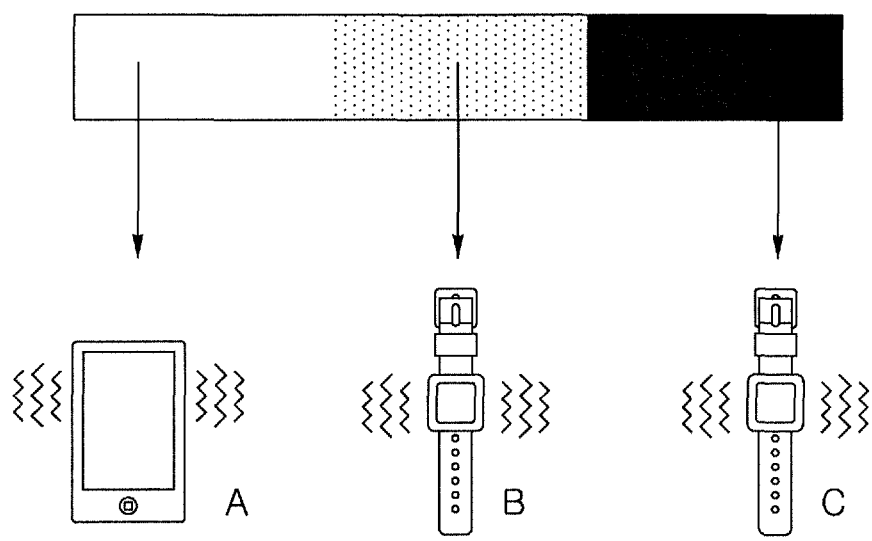
Figure 11:
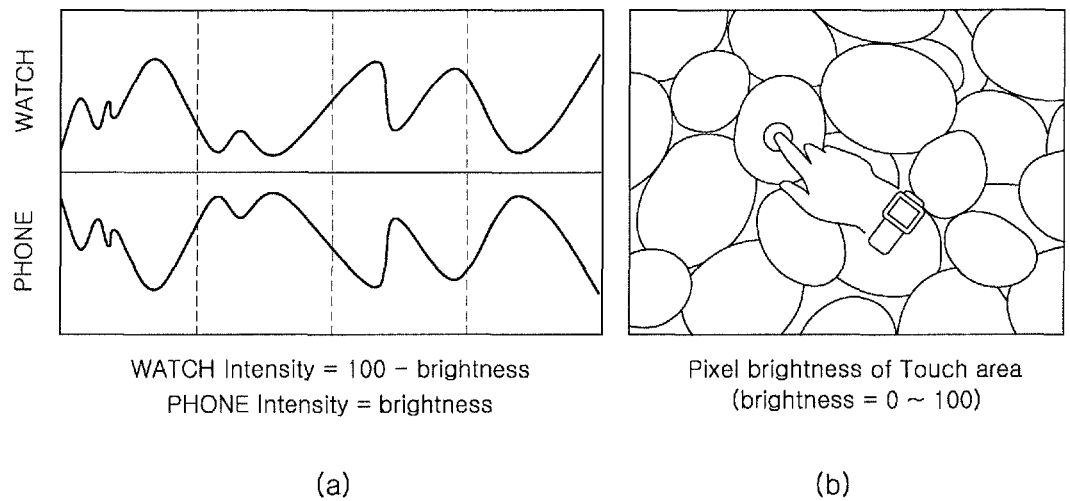

First, referring to FIGS. 8 to 10, it may be assumed that various graphical objects with various color or brightness are displayed on a display screen of the first device 310 being a smart phone, and a user wearing the second device 320 being a smart watch makes a touch operation on the display screen of the first device 310.

In this case, according to one embodiment of the invention, vibration may be generated in the first device 310 when the user touches a graphical object with a relatively bright color, and in the second device 320 when the user touches a graphical object with a relatively dark color (see FIG. 8). Further, according to one embodiment of the invention, when the user makes a drag operation over an area where graphical objects with relatively bright and relatively dark colors are alternately displayed, vibration may be alternately generated in the first device 310 and the second device 320 (see FIG. 9). Furthermore, according to one embodiment of the invention, the intensities of vibration respectively generated in two or more devices may be adjusted, with continuity thereof being maintained, according to the brightness of a graphical object displayed in a region being touched by the user. For example, as the brightness of a graphical object displayed in a region being touched by the user is higher, the intensity of vibration generated in the first device 310 may be increased, whereas that of vibration generated in the second device 320 may be reduced (see FIGS. 10 and 11).

Figure 12:
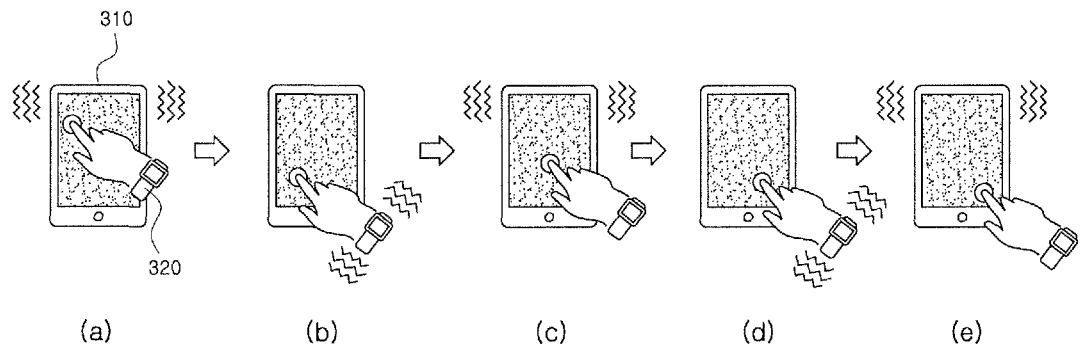
Figure 13:
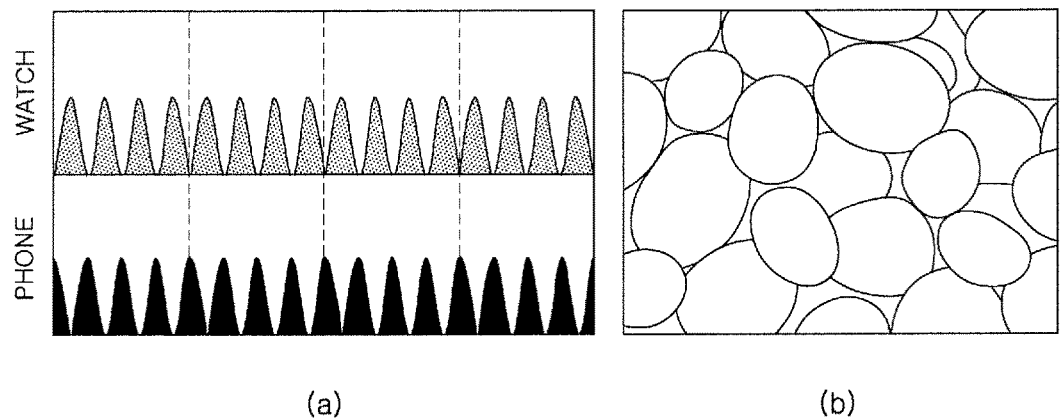
Figure 14:
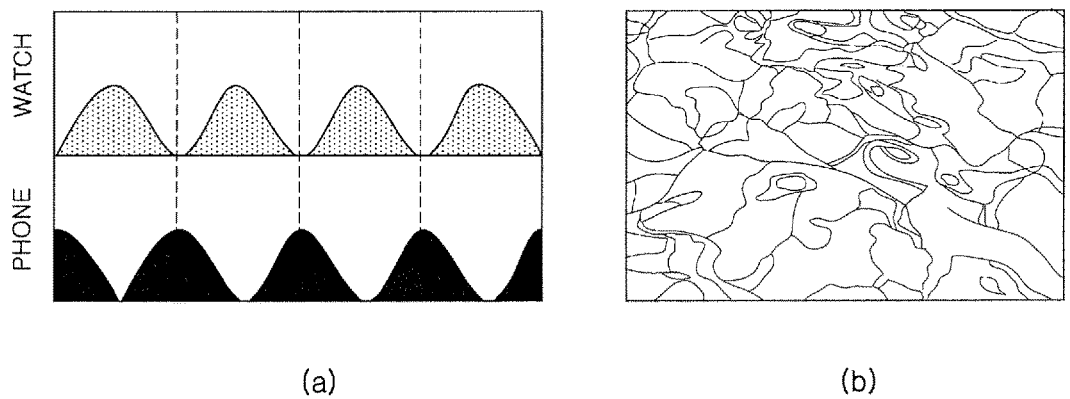

Next, referring to FIGS. 12 to 14, it may be assumed that graphical objects with various patterns are displayed on a display screen of the first device 310 being a smart phone, and a user wearing the second device 320 being a smart watch makes a touch operation on the display screen of the first device 310.

In this case, according to one embodiment of the invention, haptic feedback (i.e., vibration) corresponding to a pattern of a graphical object displayed on the display screen of the first device 310 may be generated in the first device 310 or the second device 320. Specifically, according to one embodiment of the invention, in response to the user touching the display screen of the first device 310 which is displaying a graphical object having a rough texture, the first device 310 and the second device 320 may be alternately vibrated with a short cycle, thereby allowing the user to intuitively feel the rough texture of the graphical object being displayed on the display screen of the first device 310 (see FIG. 12).

Further, according to one embodiment of the invention, the patterns of vibration generated in the first device 310 and the second device 320 may be adjusted according to the properties of a graphical object being displayed in a region touched by the user. For example, vibration may be generated in a pattern in which the intensity thereof is sharply changed in response to the user touching a region where hard and rough stones are being displayed, and in a pattern in which the intensity thereof is smoothly changed in response to the user touching a region where gentle waves are being displayed (see FIGS. 13 and 14).

Figure 15:
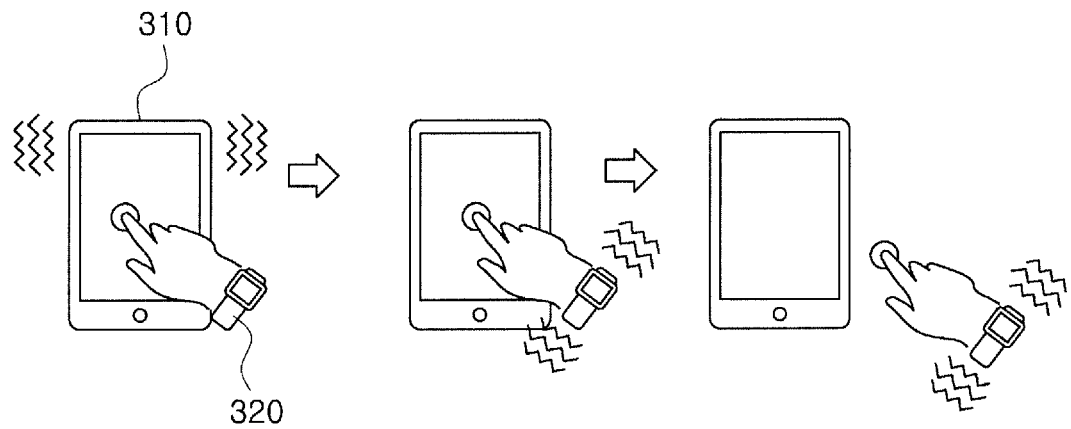
FIGS. 15 and 16 illustratively show how times at which haptic feedback is provided in two or more devices are determined according to one embodiment of the invention.
Figure 15:
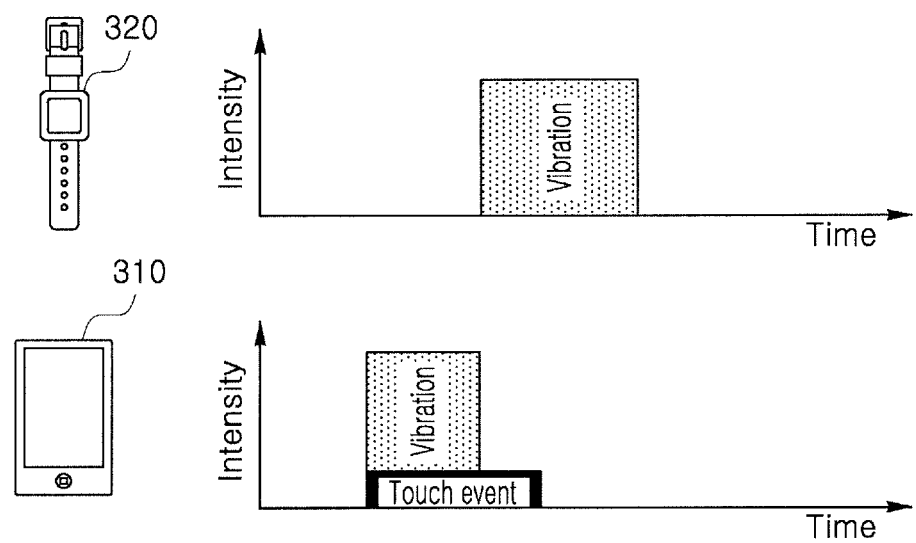
Figure 16:
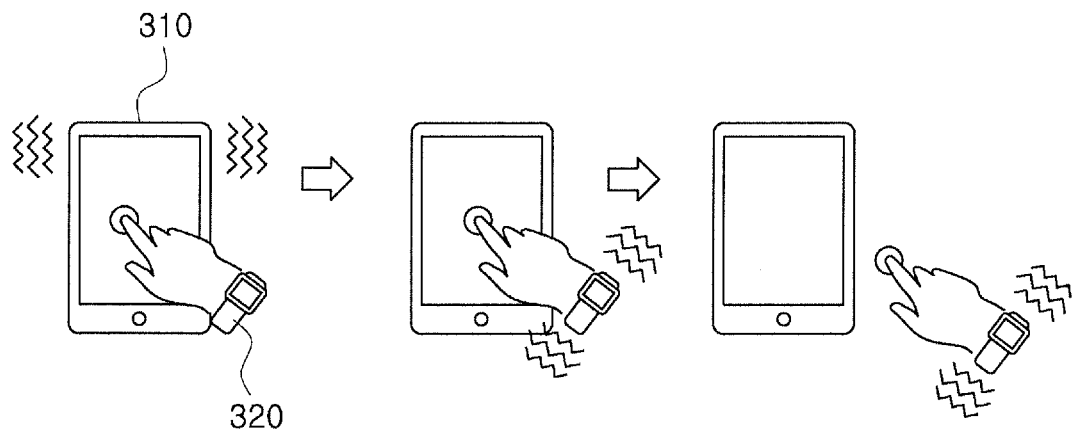
Figure 16:
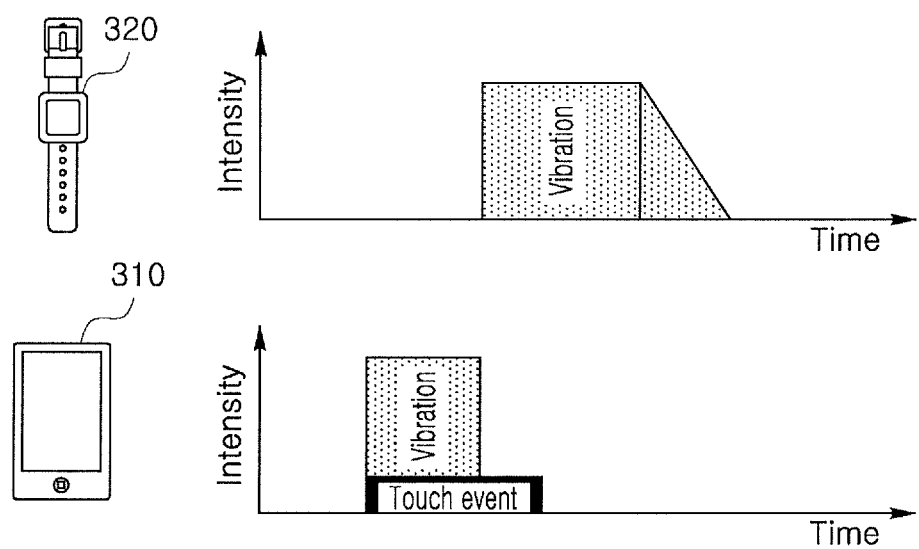

FIGS. 15 and 16 illustratively show how times at which haptic feedback is provided in two or more devices are determined according to one embodiment of the invention.

Referring to FIGS. 15 and 16, it may be assumed that a triggering event occurs in which a user wearing the second device 320 on a wrist performs a drag while touching a touch panel of the first device 310 and then performs a release without touching the touch panel. In this case, vibration may be generated in the first device 310 and then in the second device 320, and specifically, vibration may be continuously generated in the second device 320 even in a release state in which the user is no longer touching the touch panel of the first device 310 (see FIG. 15). Further, the intensity of the vibration generated in the release state may be reduced over time (see FIG. 16).

Figure 17:
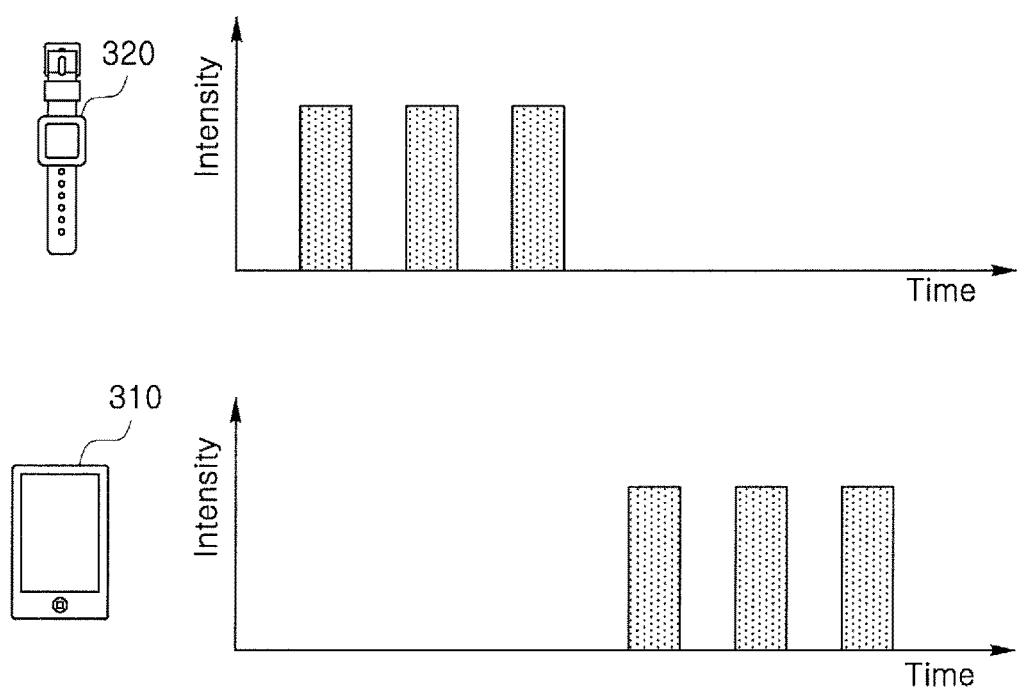
FIGS. 17 to 19 illustratively show how haptic illusion is provided in two or more devices according to one embodiment of the invention.
Figure 18:
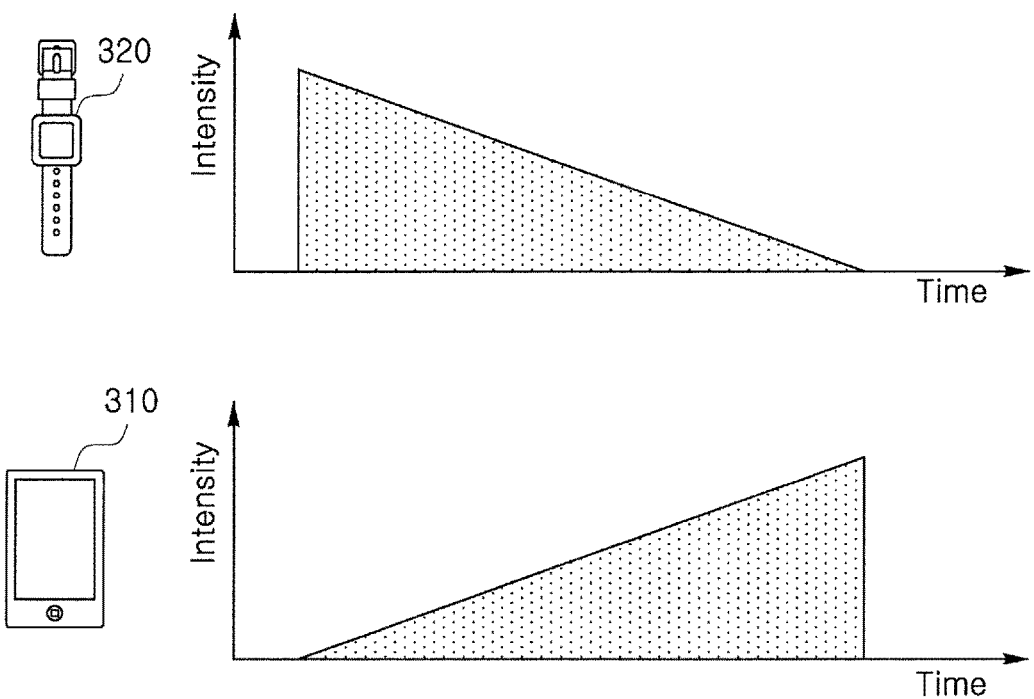
Figure 19:
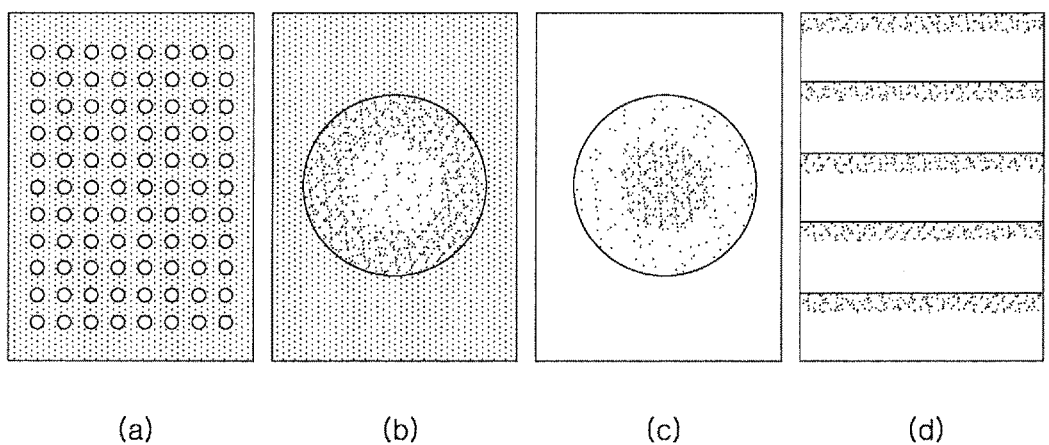

FIGS. 17 to 19 illustratively show how haptic illusion is provided in two or more devices according to one embodiment of the invention.

According to one embodiment of the invention, when vibration is sequentially generated at a predetermined interval in the first device 310 and the second device 320, which respectively contact a wrist and an elbow of a user, the user may feel that the vibration is transmitted in the direction from the wrist to the elbow (or in the opposite direction). When vibration is generated in both of the first device 310 and the second device 320, the user may feel as if the vibration is generated at a point between the points of contact of the first device 310 and the second device 320, and this phenomenon is referred to as haptic illusion or hopping rabbit illusion.

Referring to FIGS. 17 and 18, according to one embodiment of the invention, the user interface provision system 200 may sequentially generate vibration in the first device 310 and the second device 320, or may vary the intensities of vibration in the opposite directions, thereby providing the user with a user experience corresponding to haptic illusion or hopping rabbit illusion. Further, according to one embodiment of the invention, the user interface provision system 200 may adjust the patterns generated in two or more devices that contact a body of the user, thereby allowing the user to intuitively figure out the complicated patterns as shown in (a) to (d) of FIG. 19 via haptic sensation.

Figure 20:
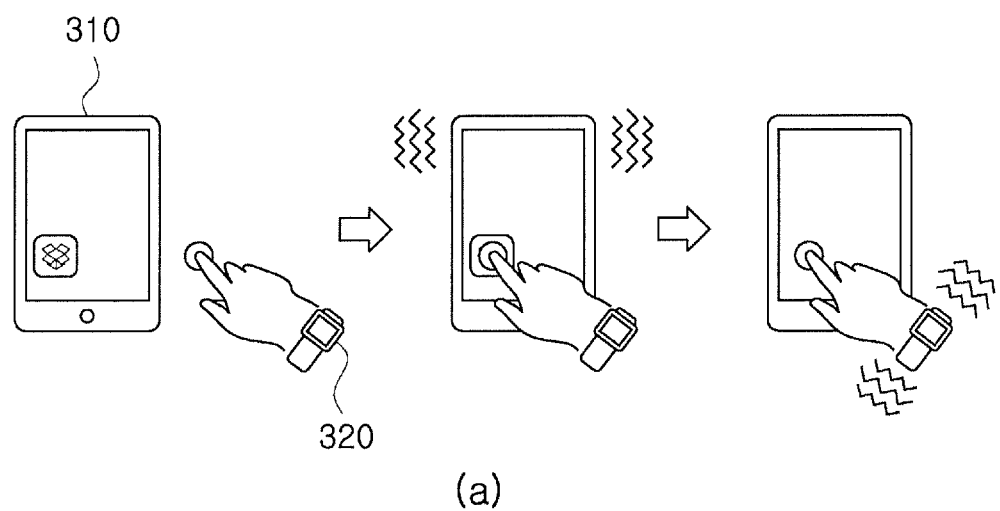
FIGS. 20 to 22 illustratively show how haptic feedback is provided on the basis of various tasks performed in a state in which two or more devices are associated according to one embodiment of the invention.
Figure 20:
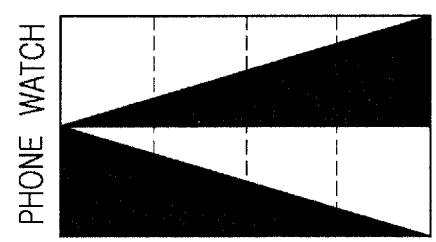
Figure 21:
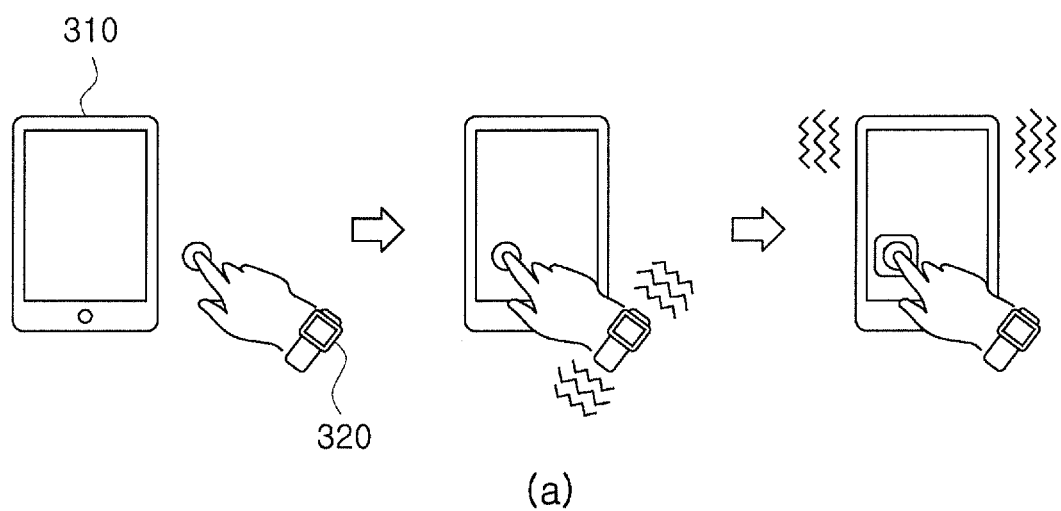
Figure 21:
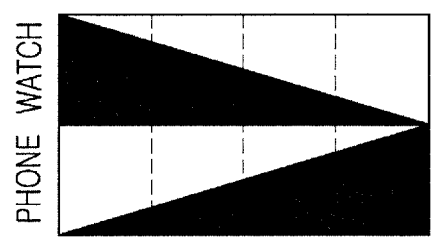
Figure 22:
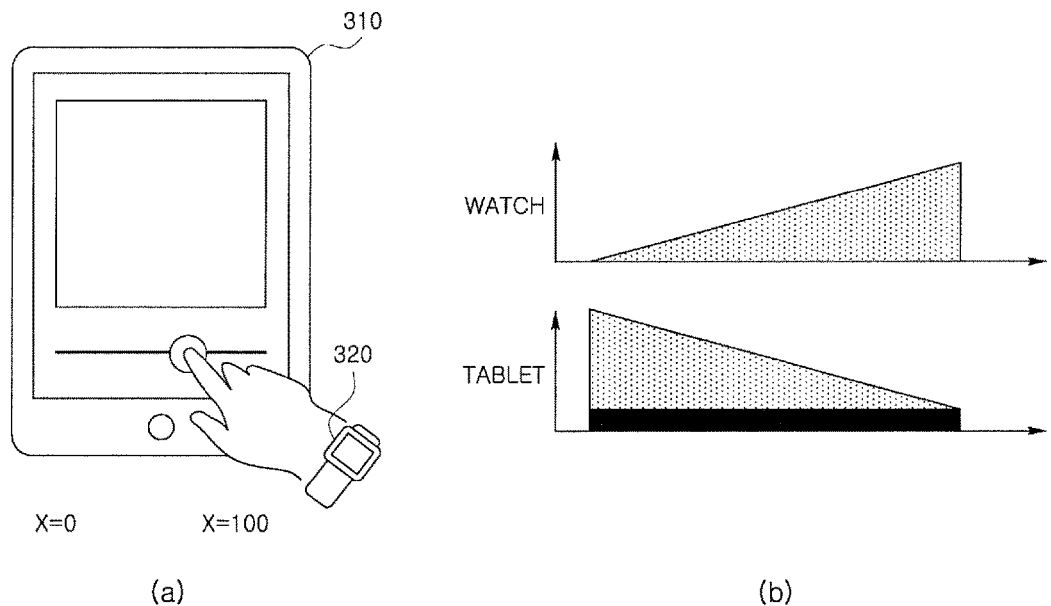

FIGS. 20 to 22 illustratively show how haptic feedback is provided on the basis of various tasks performed in a state in which two or more devices are associated according to one embodiment of the invention.

Referring to FIG. 20, it may be assumed that a user wearing the second device 320 on a wrist remains touching a region corresponding to certain contents on a touch panel of the first device 310 so that the contents may be transmitted from the first device 310 to the second device 320. In this case, according to one embodiment of the invention, the user interface provision system 200 may use haptic feedback to provide information on a transmission status of the contents transmitted from the first device 310 to the second device 320. For example, as the transmission of the contents progresses, the intensity of vibration generated in the first device 310 may be reduced, whereas that of vibration generated in the second device 320 may be increased.

Referring to FIG. 21, it may be assumed that a user wearing the second device 320 on a wrist remains touching a touch panel of the first device 310 so that contents being provided in the second device 320 may be transmitted from the second device 320 to the first device 310. In this case, according to one embodiment of the invention, the user interface provision system 200 may use haptic feedback to provide information on a transmission status of the contents transmitted from the second device 320 to the first device 310. For example, as the transmission of the contents progresses, the intensity of vibration generated in the second device 320 may be reduced, whereas that of vibration generated in the first device 310 may be increased.

Referring to FIG. 22, it may be assumed that haptic feedback is provided in the first device 310 and the second device 320 as a user wearing the second device 320 on a wrist makes an adjustment to a function of the first device 310. In this case, according to one embodiment of the invention, the user interface provision system 200 may provide haptic feedback to allow the user to directly sense a state in which the function of the first device 310 is adjusted. For example, as the volume of the first device 310 is increased, the intensity of vibration generated in the first device 310 may be reduced, whereas that of vibration generated in the second device 320 may be increased.

It is noted that although the embodiments in which haptic feedback is provided via two or more devices associated with a triggering event have been mainly described above, the present invention is not necessarily limited thereto, and a variety of feedback including acoustic feedback may also be provided as long as the objects of the invention may be achieved.

Figure 23:
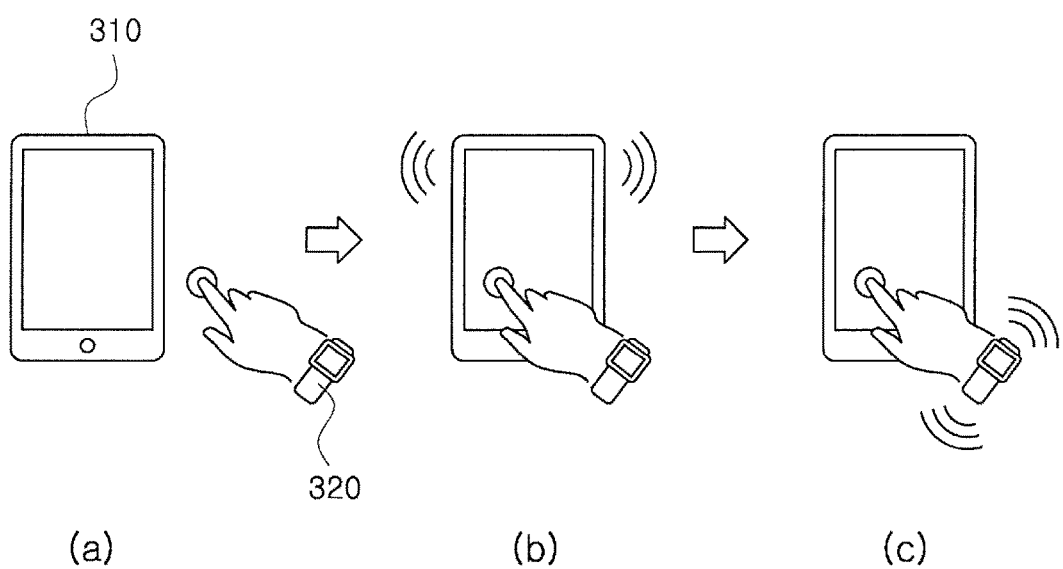
FIG. 23 illustratively shows how acoustic feedback is provided in two or more devices according to another embodiment of the invention.

FIG. 23 illustratively shows how acoustic feedback is provided in two or more devices according to another embodiment of the invention.

Referring to FIG. 23, the user interface provision system 200 according to another embodiment of the invention may provide acoustic feedback in at least one of the first device 310 and the second device 320, with reference to information on positions of the devices, information on a display state associated with a triggering event, and information on contents or functions associated with the triggering event. For example, when a triggering event occurs in which a user wearing the second device 320 on a wrist touches a touch panel of the first device 310, the user interface provision system 200 according to another embodiment of the invention may cause sound to be generated in the first device 310 and then in the second device 320, so that the user may be provided with a user experience in which the user feels as if the sound having been provided in the first device 310 has been brought to the second device 320 worn on the user's wrist.

Further, it is noted that although the embodiments in which the first device 310 is a smart phone held in the user's hand and the second device 320 is a smart watch worn on the user's wrist have been mainly described above, the present invention is not necessarily limited thereto, and the first and second devices may also be implemented in any other forms such as a smart pad, a smart glass, a smart band, and a smart ring, as long as the objects of the invention may be achieved.

The embodiments according to the invention as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present invention, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a user interface, comprising the steps of:
    acquiring information on a position where each of a first device and a second device contacts a body of a user;
    upon occurrence of a triggering event that causes haptic feedback in at least one of the first device and the second device, controlling properties of haptic feedback provided in at least one of the first device and the second device, with reference to the acquired information on the body contact position, wherein the triggering event comprises an event in which a touch operation occurs on a screen of at least one of the first device and the second device; and
    providing the haptic feedback in the first device and the second device alternatively with a cycle,
    wherein in the controlling step, the properties of haptic feedback provided in at least one of the first device and the second device are controlled, with further reference to information on a display state of a region of the screen of at least one of the first device and the second device associated with the triggering event, and
    a period of the cycle is controlled based on a graphical object displayed in the region of the screen of at least one of the first device and the second device associated with the triggering event.

2. The method of claim 1, wherein the triggering event further includes an event in which a relative relationship between postures or motions of the first device and the second device corresponds to a predetermined relationship.

3. The method of claim 1, wherein the properties of haptic feedback are specified by at least one of a time, order, interval, and intensity in which the haptic feedback is provided.

4. The method of claim 1, wherein the properties of haptic feedback provided in the first device and those of haptic feedback provided in the second device are complementary.

5. The method of claim 1, wherein in the controlling step, upon the occurrence of the triggering event, at least a part of haptic feedback provided in the first device is provided in the second device, or at least a part of haptic feedback provided in the second device is provided in the first device.

6. A non-transitory computer-readable recording medium having stored thereon a computer program for executing the method of claim 1.

7. A device for providing a user interface, comprising:
    a sensing module for acquiring information on a position where the device contacts a body of a user, and sensing occurrence of a triggering event that causes haptic feedback in at least one of the device and another device, wherein the triggering event comprises an event in which a touch operation occurs on a screen of at least one of the device and the another device; and
    a program module for, upon the occurrence of the triggering event, controlling properties of haptic feedback provided in at least one of the device and the another device, with reference to the acquired information on the body contact position,
    wherein the program module controls the properties of haptic feedback provided in at least one of the device and the another device, with further reference to information on a display state of a region of the screen of at least one of the device and the another device associated with the triggering event,
    the haptic feedback is provided in the device and the another device alternatively with a cycle, and
    a period of the cycle is controlled based on a graphical object displayed in the region of the screen of at least one of the device and the another device associated with the triggering event.

8. A system for providing a user interface, comprising:
    a control unit for acquiring information on a position where each of a first device and a second device contacts a body of a user, and upon occurrence of a triggering event that causes haptic feedback in at least one of the first device and the second device, controlling properties of haptic feedback provided in at least one of the first device and the second device, with reference to the acquired information on the body contact position, wherein the triggering event comprises an event in which a touch operation occurs on a screen of at least one of the first device and the second device; and a storage for storing information provided from at least one of the first device and the second device, wherein the control unit controls the properties of haptic feedback provided in at least one of the first device and the second device, with further reference to information on a display state of a region of the screen of at least one of the first device and the second device associated with the triggering event, the haptic feedback is provided in the first device and the second device alternatively with a cycle, and a period of the cycle is controlled based on a graphical object displayed in the region of the screen of at least one of the first device and the second device associated with the triggering event.

9. The system of claim 8, wherein upon the occurrence of the triggering event, the control unit causes at least a part of haptic feedback provided in the first device to be provided in the second device, or causes at least a part of haptic feedback provided in the second device to be provided in the first device.

10. The method of claim 1, wherein the display state comprises color or brightness of the graphical object displayed in the region of the screen of at least one of the first device and the second device associated with the triggering event.

11. The method of claim 1, wherein the haptic feedback includes a vibration, and an intensity of the vibration provided in at least one of the first device and the second device is controlled based on color or brightness of the graphical object displayed in the region of the screen of at least one of the first device and the second device associated with the triggering event.

12. The device of claim 7, wherein the haptic feedback includes a vibration, and the program module controls an intensity of the vibration provided in at least one of the device and the another device based on color or brightness of the graphical object displayed in the region of the screen of at least one of the device and the another device associated with the triggering event.

13. The system of claim 8, wherein the haptic feedback includes a vibration, and the control unit controls an intensity of the vibration provided in at least one of the first device and the second device based on color or brightness of the graphical object displayed in the region of the screen of at least one of the first device and the second device associated with the triggering event.

14. The method of claim 1, wherein the haptic feedback includes a vibration, and a pattern of the vibration provided in at least one of the first device and the second device is controlled based on a pattern of the graphical object displayed in the region of the screen of at least one of the first device and the second device associated with the triggering event.

15. The device of claim 7, wherein the haptic feedback includes a vibration, and the program module controls a pattern of the vibration provided in at least one of the device and the another device based on a pattern of the graphical object displayed in the region of the screen of at least one of the device and the another device associated with the triggering event.

16. The system of claim 8, wherein the haptic feedback includes a vibration, and the control unit controls a pattern of the vibration provided in at least one of the first device and the second device based on a pattern of the graphical object displayed in the region of the screen of at least one of the first device and the second device associated with the triggering event.

* * * * *